(12) United States Patent
Cihlar et al.

(10) Patent No.: US 10,203,114 B2
(45) Date of Patent: Feb. 12, 2019

(54) SLEEVE ASSEMBLIES AND METHODS OF FABRICATING SAME

(71) Applicant: General Electric Company, Schenectady, NY (US)

(72) Inventors: David William Cihlar, Greenville, SC (US); Jonathan Hale Kegley, Greer, SC (US); Andrew Grady Godfrey, Simpsonville, SC (US); Christopher Paul Willis, Pickens, SC (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 15/061,395

(22) Filed: Mar. 4, 2016

(65) Prior Publication Data

US 2017/0254537 A1    Sep. 7, 2017

(51) Int. Cl.
*F23R 3/00* (2006.01)
*F02C 3/04* (2006.01)
*F23R 3/60* (2006.01)

(52) U.S. Cl.
CPC .............. *F23R 3/002* (2013.01); *F02C 3/04* (2013.01); *F23R 3/60* (2013.01);
(Continued)

(58) Field of Classification Search
CPC .............. F23R 3/002; F23R 2900/0018; F23R 2900/03034; F02C 3/145
See application file for complete search history.

(56) References Cited

U.S. PATENT DOCUMENTS

| 4,099,799 A | 7/1978 | Etsion |
| 4,567,730 A * | 2/1986 | Scott ................. F23R 3/007 |
| | | 60/752 |

(Continued)

FOREIGN PATENT DOCUMENTS

| CA | 2597846 C | 10/2014 |
| CH | 698570 A2 | 8/2009 |

(Continued)

OTHER PUBLICATIONS

Extended European Search Report and Opinion issued in connection with corresponding EP Application No. 17157808.1 dated Jul. 14, 2017.

(Continued)

*Primary Examiner* — Steven Sutherland
(74) *Attorney, Agent, or Firm* — Armstrong Teasdale LLP

(57) ABSTRACT

A sleeve assembly for a combustion system is provided. The sleeve assembly includes a liner defining a combustion chamber having a flow axis and a primary combustion zone. The liner has a forward end and an aft end such that the liner circumscribes the flow axis. The sleeve assembly also includes a shell circumscribing the liner such that a cooling duct is defined between the liner and the shell. The shell includes a unisleeve having a forward end and an aft end. The aft end of the unisleeve is positioned axially upstream of the aft end of the liner, defining a gap between the aft end of the liner and the aft end of the unisleeve. The unisleeve is mounted to the liner at circumferentially spaced locations along an axial plane between the forward end and the aft end of the unisleeve.

20 Claims, 3 Drawing Sheets

(52) U.S. Cl.
CPC .............. *F23R 2900/00012* (2013.01); *F23R 2900/00018* (2013.01); *F23R 2900/03043* (2013.01)

(56) References Cited

U.S. PATENT DOCUMENTS

| | | |
|---|---|---|
| 4,903,480 A | 2/1990 | Lee et al. |
| 5,220,787 A | 6/1993 | Bulman |
| 5,640,851 A | 6/1997 | Toon et al. |
| 5,791,137 A | 8/1998 | Evans et al. |
| 5,797,267 A | 8/1998 | Richards |
| 6,915,636 B2 | 7/2005 | Stuttaford et al. |
| 7,878,000 B2 | 2/2011 | Mancini et al. |
| 8,113,001 B2 | 2/2012 | Singh et al. |
| 8,387,391 B2 | 3/2013 | Patel et al. |
| 8,438,856 B2 | 5/2013 | Chila et al. |
| 8,590,311 B2 | 11/2013 | Parsania et al. |
| 8,745,987 B2 | 6/2014 | Stoia et al. |
| 8,863,525 B2 | 10/2014 | Toronto et al. |
| 2009/0044540 A1 | 2/2009 | Pangle et al. |
| 2009/0218421 A1 | 9/2009 | Kumaravelu |
| 2010/0293957 A1 | 11/2010 | Chen et al. |
| 2011/0203287 A1 | 8/2011 | Chila et al. |
| 2011/0289928 A1 | 12/2011 | Fox et al. |
| 2012/0304652 A1* | 12/2012 | Crawley ............. F01D 9/023 60/740 |
| 2013/0067921 A1 | 3/2013 | Hadley et al. |
| 2013/0174558 A1* | 7/2013 | Stryapunin ......... F23R 3/286 60/734 |
| 2014/0026581 A1 | 1/2014 | Clifford et al. |
| 2014/0137566 A1 | 5/2014 | Shershnyov et al. |
| 2014/0260258 A1 | 9/2014 | Melton et al. |
| 2014/0260264 A1 | 9/2014 | Stoia et al. |
| 2014/0260272 A1 | 9/2014 | Dicintio et al. |
| 2014/0260273 A1 | 9/2014 | Melton et al. |
| 2014/0260274 A1 | 9/2014 | Stoia et al. |
| 2014/0260275 A1 | 9/2014 | Melton et al. |
| 2014/0260277 A1 | 9/2014 | Dicintio et al. |
| 2014/0260279 A1 | 9/2014 | Dicintio et al. |
| 2014/0260280 A1 | 9/2014 | Willis et al. |
| 2014/0260318 A1 | 9/2014 | Willis et al. |
| 2014/0260319 A1 | 9/2014 | Melton et al. |
| 2014/0352316 A1* | 12/2014 | Fadde ................. F23R 3/002 60/772 |
| 2014/0360193 A1 | 12/2014 | Stoia et al. |
| 2015/0027126 A1 | 1/2015 | Berry |
| 2015/0300206 A1 | 10/2015 | Sultana et al. |
| 2016/0265781 A1 | 9/2016 | Carnell, Jr. et al. |
| 2016/0265782 A1 | 9/2016 | Bhagat et al. |
| 2017/0254537 A1 | 9/2017 | Cihlar et al. |
| 2017/0254540 A1 | 9/2017 | DiCintio et al. |
| 2017/0254542 A1 | 9/2017 | Cihlar et al. |
| 2017/0268779 A1 | 9/2017 | Godfrey et al. |
| 2017/0268783 A1 | 9/2017 | Cihlar et al. |

FOREIGN PATENT DOCUMENTS

| | | |
|---|---|---|
| DE | 29618609 U1 | 12/1996 |
| DE | 102004045993 A1 | 4/2006 |
| EP | 2085574 A1 | 8/2009 |
| GB | 2014644 A | 8/1979 |
| WO | 2014090741 A1 | 6/2014 |

OTHER PUBLICATIONS

Extended European Search Report and Opinion issued in connection with related EP Application No. 17157810.7 dated Jul. 6, 2017.
Extended European Search Report and Opinion issued in connection with related EP Application No. 17157809.9 dated Jul. 6, 2017.

* cited by examiner

SLEEVE ASSEMBLIES AND METHODS OF FABRICATING SAME

BACKGROUND

The field of this disclosure relates generally to sleeve assemblies and, more particularly, to a sleeve assembly for use with a combustor in a turbine assembly.

At least some known turbine assemblies include a compressor, a combustor, and a turbine. Gas flows into the compressor and is compressed. Compressed gas is then discharged into the combustor and mixed with fuel, and the resulting mixture is ignited to generate combustion gases. The combustion gases are channeled from the combustor through the turbine, thereby driving the turbine which, in turn, may power an electrical generator coupled to the turbine.

Many known combustors employ a sleeve assembly that includes a liner that defines a combustion chamber in which the mixture of fuel and compressed gas is ignited. To extend the useful life of the sleeve assembly, it is common for the sleeve assembly to include an outer sleeve that surrounds the liner, such that a flow of compressed gas directed between the liner and sleeve cools the liner. However, it may be difficult to adequately cool the liner of at least some known sleeve assemblies, particularly in systems that rely on impingement or film cooling. In these systems, the amount of cooling air may be insufficient to uniformly cool the liner without incurring a significant pressure drop in the gas being conveyed to the head end. As a result of non-uniform cooling, some existing sleeve assemblies have experienced high stresses at the downstream connection point between the inner liner and the surrounding sleeve.

It is common for sensors or other ignition-related components to be inserted into the combustion chamber through the sleeve assembly to facilitate monitoring or ignition. In some cases, the design of the sleeve assemblies may make it difficult to properly locate sensors and other instruments in the combustion chamber.

Not adequately cooling the sleeve assembly and/or not being able to properly position sensors within the combustion chamber may result in portions of the sleeve assembly and/or other combustor or turbine components overheating. Over time, continued exposure to overheating may cause thermal cracking and/or premature failure of such components.

BRIEF DESCRIPTION

In one aspect, a sleeve assembly for a combustion system is provided. The sleeve assembly includes a liner defining a combustion chamber having a flow axis and a primary combustion zone. The liner has a forward end and an aft end such that the liner circumscribes the flow axis. The sleeve assembly also includes a shell circumscribing the liner such that a cooling duct is defined between the liner and the shell. The shell includes a unisleeve having a forward end and an aft end. The aft end of the unisleeve is positioned axially upstream of the aft end of the liner, defining a gap between the aft end of the liner and the aft end of the unisleeve. The unisleeve is mounted to the liner at circumferentially spaced locations along an axial plane between the forward end and the aft end of the unisleeve.

In another aspect, a method of fabricating a sleeve assembly for a combustion system is provided. The method includes forming a liner defining a combustion chamber including a flow axis and a primary combustion zone. The liner has a forward end and an aft end such that the liner circumscribes the flow axis. The method also includes coupling a shell to the liner such that the shell circumscribes the liner to define a cooling duct between the liner and the shell. The shell includes a unisleeve having a forward end and an aft end. The aft end of the unisleeve is positioned axially upstream of the aft end of the liner, defining a gap between the aft end of the liner and the aft end of the unisleeve. Coupling the shell to the liner includes mounting the unisleeve to the liner at circumferentially spaced locations along a single axial plane between the forward end and the aft end of the unisleeve.

In another aspect, a combustion system is provided. The combustion system includes a fuel injector and a sleeve assembly having a liner defining a combustion chamber including a flow axis and a primary combustion zone. The liner has a forward end and an aft end such that the liner circumscribes the flow axis. The sleeve assembly also has a shell circumscribing the liner such that a cooling duct is defined between the liner and the shell. The shell includes a unisleeve having a forward end and an aft end. The aft end of the unisleeve is positioned axially upstream of the aft end of the liner, defining a gap between the aft end of the liner and the aft end of the unisleeve. The unisleeve is mounted to the liner at circumferentially spaced locations along an axial plane between the forward end and the aft end of the unisleeve.

DETAILED DESCRIPTION

The following detailed description illustrates sleeve assemblies by way of example and not by way of limitation. The description should enable one of ordinary skill in the art to make and use the sleeve assemblies, and the description describes several embodiments of the sleeve assemblies, including what is presently believed to be the best modes of making and using the sleeve assemblies. An exemplary sleeve assembly is described herein as being coupled within a combustor of a turbine assembly. However, it is contemplated that the methods of fabrication described herein have a general application to a broad range of systems in a variety of fields other than turbine assemblies.

Figure 1:
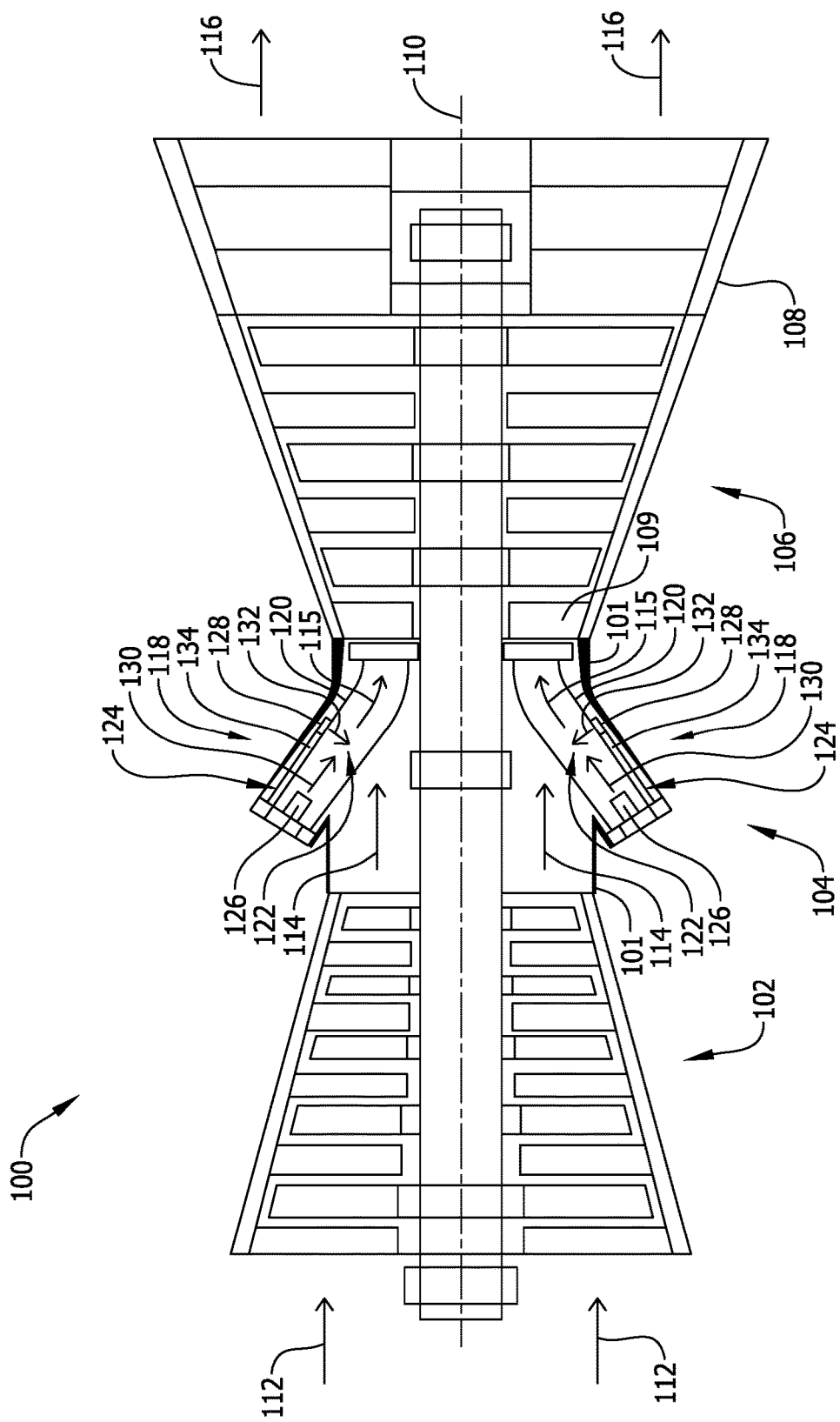
FIG. 1 is a schematic illustration of an exemplary turbine assembly.

FIG. 1 illustrates an exemplary turbine assembly 100. In the exemplary embodiment, turbine assembly 100 is a gas turbine assembly that includes a compressor section 102, a combustor section 104, and a turbine section 106 coupled in flow communication with one another within a casing 108 along a centerline axis 110. In operation, a working gas 112 flows into compressor section 102 and is compressed and channeled into combustor section 104. Compressed gas 114 is mixed with fuel (not shown) and ignited in combustor section 104 to generate combustion gases 115 that are channeled into turbine section 106 and then discharged from turbine section 106 as exhaust 116.

In the exemplary embodiment, combustor section 104 includes a plurality of combustion cans 118. Each combustion can 118 has a sleeve assembly 120 that defines a combustion chamber 122. A fuel delivery system 124 is coupled to each combustion can 118 and includes a primary fuel injector 126 located at the forward end of the combustion can 118. An axial fuel staging (AFS) system supplies fuel to a secondary fuel injector 128 positioned axially downstream from primary fuel injector 126. A first mixture 130 of fuel and compressed gas is injected into combustion chamber 122 in an axial direction via primary fuel injector 126, and a second mixture 132 of fuel and compressed gas is injected in a radial direction into combustion chamber 122 via secondary fuel injector 128. Each secondary fuel injector 128 is coupled to sleeve assembly 120 and is supplied with fuel and compressed gas via a conduit assembly 134. Combustor 104 may have any suitable number and arrangement of primary and secondary fuel injectors 126, 128 that are supplied with fuel and/or compressed gas in any suitable manner.

Figure 2:
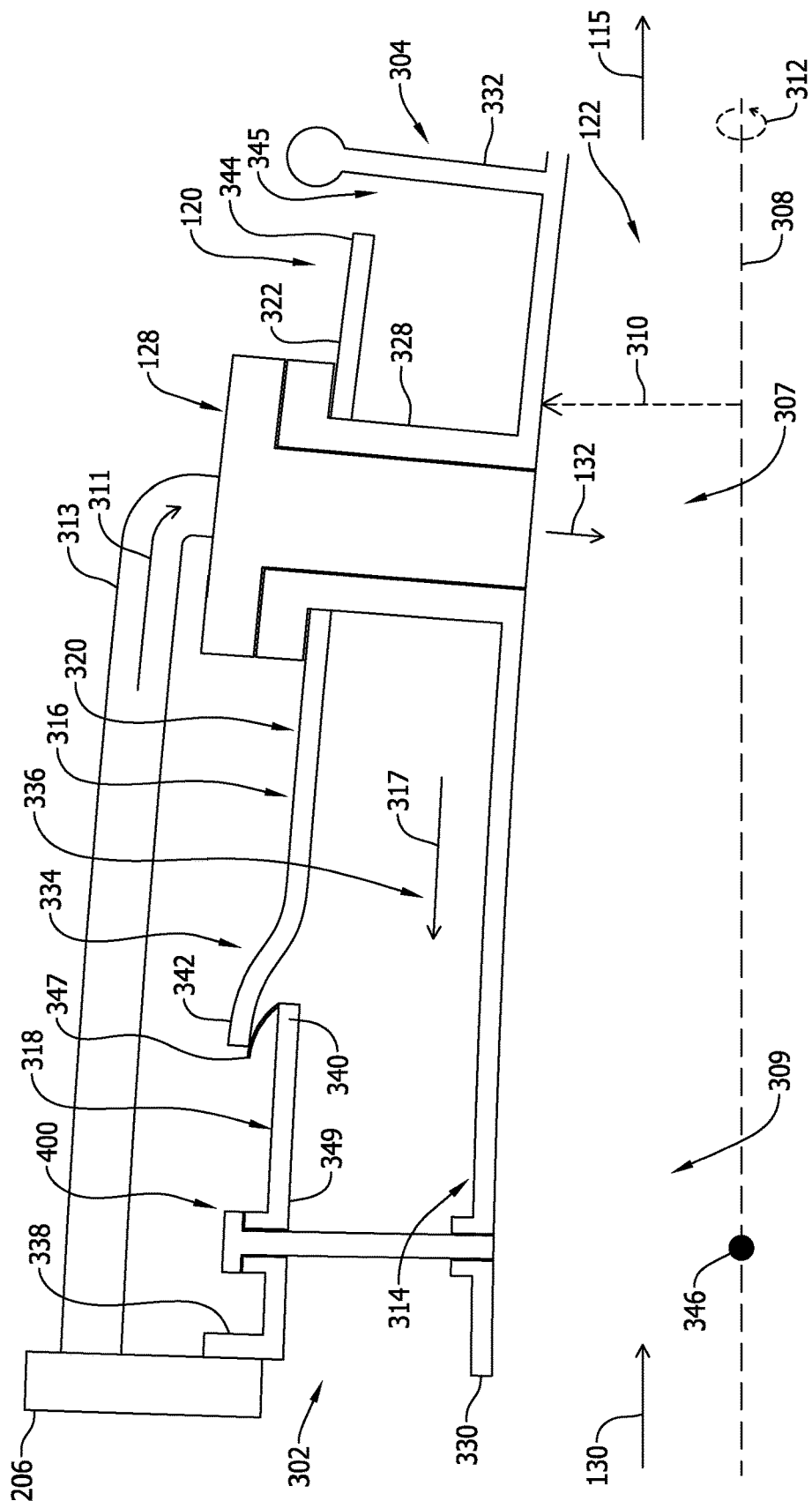
FIG. 2 is a schematic illustration of an exemplary sleeve assembly for use with a combustion can of the turbine assembly shown in FIG. 1.
Figure 3:
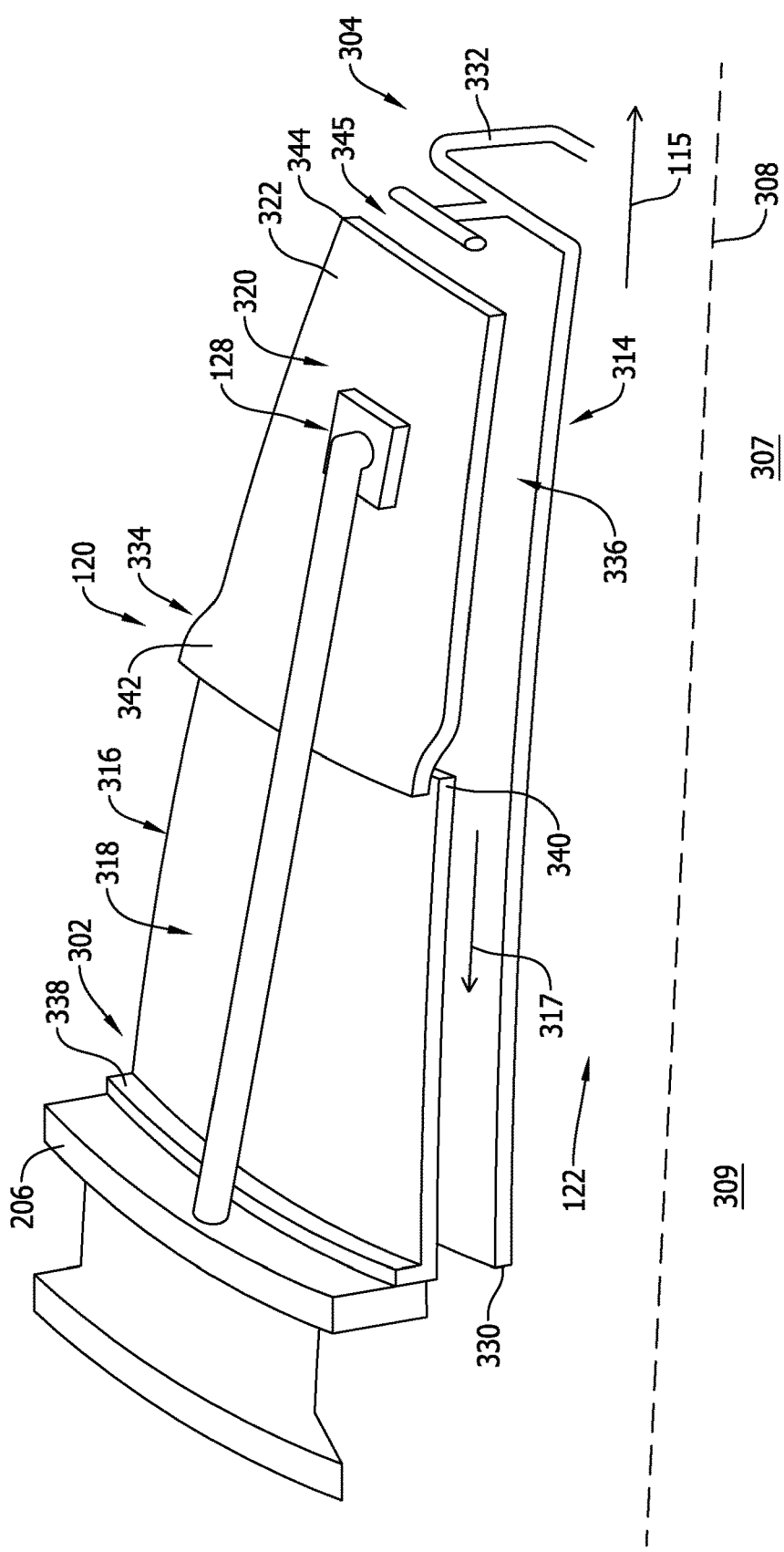
FIG. 3 is a perspective view of a segment of the sleeve assembly shown in FIG. 2.

FIGS. 2 and 3 illustrate an exemplary sleeve assembly 120 for use with combustion can 118 of turbine assembly 100. In the exemplary embodiment, sleeve assembly 120 has a forward end 302 that is coupled to a combustor casing flange 206, which is in turn coupled to a compressor discharge casing (101 in FIG. 1), and an aft end 304 that is coupleable to a nozzle (109 in FIG. 1) of turbine section 106. Sleeve assembly 120 envelops a combustion chamber 122 between forward and aft ends 302 and 304, respectively. Moreover, at least one secondary fuel injector 128 is coupled to sleeve assembly 120. Fuel injector 128 is mounted (e.g., bolted or otherwise secured) to and penetrates sleeve assembly 120 via a boss 328 that is secured (e.g., welded) to sleeve assembly 120, such that fuel injector 128 is in flow communication with combustion chamber 122 at a secondary combustion zone 307 of combustion chamber 122.

In at least one embodiment, an instrument 400 (e.g., an igniter, a cross-fire tube, a temperature sensor, a pressure sensor, or other suitable sensor) is coupled to sleeve assembly 120. Instrument 400 is mounted to and penetrates sleeve assembly 120 at a primary combustion zone 309 of combustion chamber 122, which is forward of secondary combustion zone 307. Alternately, or in addition, instrument 400 may penetrate sleeve assembly 120 at any suitable zone of the combustion chamber 122 (such as secondary combustion zone 307). When instrument 400 is a sensor, instrument 400 monitors an aspect of the combustion process within primary combustion zone 309. In such cases, instrument 400 may be integrated with a controls system (not shown). Instrument 400 may extend any suitable distance into combustion chamber 122 or, in the case of a cross-fire tube, may not extend through the sleeve assembly 120 per se but be in fluid communication with the combustion chamber 122.

During operation of turbine assembly 100, first mixture 130 of fuel and compressed gas is injected into combustion chamber 122 via a primary fuel injector (126 in FIG. 1) and ignited in primary combustion zone 309 of combustion chamber 122, and second mixture 132 of fuel (e.g., fuel 311 supplied via a fuel tube 313) and compressed gas is injected into combustion chamber 122 via secondary fuel injector 128 and ignited in secondary combustion zone 307, thereby generating combustion gases 115 that flow into turbine section 106. In the exemplary embodiment, combustion chamber 122 has a flow axis 308 defined within sleeve assembly 120, such that sleeve assembly 120 has a radial dimension 310 and a circumferential dimension 312 relative to flow axis 308. Although only a circumferential region of sleeve assembly 120 is illustrated in FIG. 3, sleeve assembly 120 nonetheless completely circumscribes flow axis 308. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

In the exemplary embodiment, sleeve assembly 120 includes a liner (or unibody) 314 and a shell 316. Shell 316 has a first component 318 (or flow sleeve) and a second component 320 (or unisleeve), both of which circumscribe flow axis 308. In an exemplary embodiment, first component 318 is a single-piece, unitary structure that is ring-shaped and that is fabricated via a turning process, such that first component 318 is rigid (i.e., substantially inflexible) and circumscribes a forward portion of liner 314. In an exemplary embodiment, second component 320 is a multi-piece structure that includes a plurality of individually-formed pieces 322 (only one of which is illustrated) that are each fabricated via a stamping process (e.g., a punching process), after which pieces 322 are formed and coupled together and/or to liner 314 via boss(es) 328 such that pieces 322 collectively circumscribe the aft portion of liner 314. In other embodiments, first component 318 and second component 320 may be fabricated using any other suitable processes, and each may include any suitable number of pieces 322 that enables sleeve assembly 120 to function as described herein (e.g., first component 318 may not be a single-piece, unitary structure, and/or second component 320 may not be a multi-piece structure). Alternatively, first component 318 and second component 320 may have any suitable level of rigidity or flexibility (e.g., first component 318 may be flexible, and/or second component 320 may be rigid).

In the exemplary embodiment, liner 314 is a single-piece, unitary structure having a forward end 330 and an aft end (or frame) 332, such that liner 314 circumscribes flow axis 308 between ends 330 and 332. Forward end 330 is generally cylindrical in relation to flow axis 308, and aft end 332 tapers in a forward-to-aft direction in relation to flow axis 308. Moreover, shell components 318 and 320 are coupled together at a seam 334 that circumscribes flow axis 308. As such, a cooling duct 336 is defined between liner 314 and shell 316 such that, during operation of turbine assembly 100, a stream 317 of compressed gas 114 may be channeled through cooling duct 336 from near aft end 304 towards forward end 302, thereby cooling liner 314. More specifically, shell first component 318 has a forward end 338 and an aft end 340, and shell second component 320 has a forward end 342 and an aft end 344. End 338 is coupled to flange 206 such that shell first component 318 extends from flange 206 to aft end 340. Shell first component 318 thereby extends axially aft of the generally cylindrical, forward end 330 of liner 314 such that aft end 340 of shell first component 318 is positioned axially between ends 330 and 332 of liner 314.

In the exemplary embodiment, forward end 342 of shell second component 320 is coupled to aft end 340 of shell first component 318 at seam 334, such that shell second component 320 extends from aft end 340 of shell first component 318 to aft end 344 of shell second component 320. Notably, aft end 344 of shell second component 320 is axially spaced apart from aft end 332 of liner 314, such that a circumferential gap 345 is defined between aft ends 344 and 332 to permit cooling gas stream 317 into cooling duct 336. Rather than aft end 344 of shell second component 320 being connected to aft end 304 of liner 314, shell second component 320 is connected to liner 314 via discrete, circumferentially spaced mounting elements, such as injector bosses 328. Thus, shell second component 320 is supported centrally, and aft end 344 is unsupported (that is, cantilevered). Secondary fuel injectors 128 and their corresponding bosses 328 may be located along a single axial plane (as shown), or may be located in multiple axial planes.

The cooling gas stream 317 flows through gap 345, which is in fluid communication with cooling duct 336, around injector bosses 328 located in cooling duct 336 and to the head end of combustion can 118, where gas stream 317 is mixed with fuel and introduced into primary combustion zone 309 as first fuel/air mixture 130. This arrangement permits a high volume of air to be directed through cooling duct 336 and reduces the pressure losses that would otherwise occur, if shell second component 320 were attached directly to aft end 304 of liner 314 and gas stream 317 were introduced solely via impingement or film cooling holes in shell second component 320. Optionally, shell second component 320 may include impingement cooling holes (not shown) to direct additional cooling flow to localized hot areas of liner 314, but it should be understood that only a small percentage of the gas stream 317 is directed through such impingement holes.

In the exemplary embodiment, shell second component 320 is positioned radially outward of (i.e., overlaps) shell first component 318 at seam 334, and a circumferential seal 347 (e.g., a hula seal) is positioned between shell components 318 and 320 at seam 334 to facilitate a damping and sealing function (e.g., to facilitate preventing gas stream 317 from exiting cooling duct 336 via seam 334). In other embodiments, shell second component 320 may be coupled to shell first component 318 in any suitable manner.

Because shell second component 320 is a multi-piece structure that is fabricated by coupling together a plurality of flexible pieces 322, it can be difficult to control the orientation of shell second component 320 relative to flow axis 308 (i.e., it can be difficult to incorporate into shell second component 320 features that are to have a precise axial and/or circumferential alignment relative to flow axis 308). On the other hand, because shell first component 318 is fabricated as a single-piece, unitary structure that is rigid, it is easier to control the orientation of shell first component 318 relative to flow axis 308 (e.g., it is easier to incorporate into shell first component 318 features that have a precise axial and/or circumferential alignment relative to flow axis 308). As described in more detail below, sleeve assembly 120 addresses at least some of the difficulty associated with precisely orienting shell second component 320 relative to flow axis 308.

In the exemplary embodiment, it is desirable for instrument 400 to be mounted on sleeve assembly 120 in a precise axial and circumferential alignment relative to an axial location 346 of primary combustion zone 309 defined in combustion chamber 122 (e.g., it is desirable for instrument 400 to be aligned at a specific location 346 along flow axis 308). However, as set forth above, such alignment can be difficult to achieve when mounting instrument 400 on shell second component 320. Thus, in the exemplary embodiment, shell first component 318 extends from flange 206 and overlaps liner 314 at primary combustion zone location 346 along flow axis 308. This extension of shell first component 318 enables instrument 400 to be mounted to shell first component 318, rather than shell second component 320, while being axially aligned at primary combustion zone location 346. Because instrument 400 is coupled to shell first component 318, instrument 400 is mounted to sleeve assembly 120 in a more structurally secure manner, thereby facilitating a more precise orientation of instrument 400 relative to flow axis 308 (i.e., axial and/or circumferential displacement of instrument 400 is better inhibited during operation of turbine assembly 100).

Additionally, the cooling capability of sleeve assembly 120 is also improved because the cross-sectional area of cooling duct 336 remains substantially the same size at location 346 during operation of turbine assembly 100. In other words, the relative radial positioning of rigid shell first component 318 and liner 314 at location 346 are better controlled such that the cross-sectional area of cooling duct 336 at location 346 decreases less (due to thermal expansion of liner 314) during the operation of turbine assembly 100.

In some embodiments, shell first component 318 may be formed with an inner surface 349 that is contoured convexly to define a reduced cross-sectional area, or a pinch point, (not shown) of cooling duct 336 that may be axially aligned with location 346 of primary combustion zone 309 near forward end 338 of shell first component 318, or at any other suitable location along flow axis 308 of combustion chamber 122. This reduced cross-sectional area generates a convective, venturi-type cooling effect, which in turn causes gas stream 317 to accelerate through cooling duct 336 radially outward of primary combustion zone 309, while distributing gas stream 317 in a more even or substantially more uniform manner throughout cooling duct 336.

The methods and systems described herein facilitate an improved sleeve assembly for use with a combustor. For example, the methods and systems facilitate enhanced cooling of a liner and a shell of the sleeve assembly, thereby improving the durability and useful life of the liner and the shell. Additionally, the methods and systems described herein facilitate shortening the length of the liner as compared to known liners, which in turn strengthens the liner, reduces the overall weight of the combustor, and reduces costs associated with fabricating the liner. The methods and systems also increase structural support for instruments that penetrate the sleeve assembly and/or extend into a combustion chamber of the combustor. Moreover, the methods and systems facilitate precisely orienting instruments relative to the combustion chamber, and maintaining the relative orientation of the instruments during operation of the combustor, because the instruments are coupled to a single-piece, circumferential shell component that is rigid. As such, the methods and systems facilitate improving the dynamic stress capability of the sleeve assembly because the connections between the shell and its associated liner (and instruments) are more uniformly cooled and more structurally secure, thereby increasing the useful life of the combustor in general and the sleeve assembly in particular. The methods and systems further facilitate reducing the time needed to assemble the combustor, reducing the cost of servicing the combustor, and improving the overall operating efficiency of the combustor because the sleeve assembly is cooled and is coupled to its associated instrument(s) and/or fuel injector(s) in an enhanced manner.

Exemplary embodiments of methods and systems are described above in detail. The methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A sleeve assembly for a combustion system, said sleeve assembly comprising:
   a liner defining a combustion chamber including a flow axis and a primary combustion zone, said liner having a forward end and an aft end such that said liner circumscribes the flow axis; and
   a shell circumscribing said liner such that a cooling duct is defined between said liner and said shell, said shell comprising a unisleeve having a forward end and an aft end, said aft end of said unisleeve being positioned axially upstream of said aft end of said liner, defining a circumferential gap between said aft end of said liner and said aft end of said unisleeve, wherein said unisleeve is mounted to said liner at circumferentially spaced locations along an axial plane between said forward end and said aft end of said unisleeve, and wherein said aft end of said unisleeve is cantilevered from said circumferentially spaced locations and otherwise unsupported.

2. A sleeve assembly in accordance with claim 1, wherein said shell further comprises a flow sleeve coupled to said unisleeve, said flow sleeve having a forward end and an aft end, wherein said aft end of said flow sleeve is positioned axially between said ends of said liner such that said flow sleeve overlaps a forward portion of said liner that defines the primary combustion zone of said combustion chamber.

3. A sleeve assembly in accordance with claim 2, wherein at least one of said flow sleeve and said liner are a single-piece, unitary structure.

4. A sleeve assembly in accordance with claim 2, wherein said unisleeve is coupled to said flow sleeve at a seam, said unisleeve overlapping said flow sleeve at said seam.

5. A sleeve assembly in accordance with claim 4, wherein said shell comprises a seal coupled between said flow sleeve and said unisleeve at said seam.

6. A sleeve assembly in accordance with claim 1, wherein said unisleeve is a multi-piece structure.

7. A sleeve assembly in accordance with claim 1, wherein said circumferential gap is in fluid communication with said cooling duct.

8. A sleeve assembly in accordance with claim 1, further comprising a fluid gas flow path defined by at least the circumferential gap and the cooling duct.

9. A method of fabricating a sleeve assembly for a combustion system, said method comprising:
   positioning a liner defining a combustion chamber including a flow axis and a primary combustion zone, the liner having a forward end and an aft end such that the liner circumscribes the flow axis; and
   coupling a shell to the liner such that the shell circumscribes the liner to define a cooling duct between the liner and the shell, the shell including a unisleeve having a forward end and an aft end, the aft end of the unisleeve being positioned axially upstream of the aft end of the liner, defining a circumferential gap between the aft end of the liner and the aft end of the unisleeve;
   wherein said coupling the shell to the liner comprises mounting the unisleeve to the liner at circumferentially spaced locations along a single axial plane between the forward end and the aft end of the unisleeve, such that the aft end of the unisleeve is cantilevered from the circumferentially spaced locations and otherwise unsupported.

10. A method in accordance with claim 9, further comprising forming the shell with a flow sleeve coupled to the unisleeve, the flow sleeve having a forward end and an aft end, the aft end of the flow sleeve being positioned axially between the ends of the liner such that the flow sleeve overlaps a portion of the liner that defines the primary combustion zone of the combustion chamber.

11. A method in accordance with claim 10, further comprising forming at least one of the flow sleeve and the liner as a single-piece, unitary structure.

12. A method in accordance with claim 10, further comprising coupling the unisleeve to the flow sleeve at a seam such that the unisleeve overlaps the flow sleeve at the seam.

13. A method in accordance with claim 12, wherein said coupling the unisleeve to the flow sleeve further comprises providing a seal between the flow sleeve and the unisleeve at the seam.

14. A method in accordance with claim 9, further comprising forming the unisleeve as a multi-piece structure.

15. A combustion system comprising:
   a fuel injector; and
   a sleeve assembly comprising:
      a liner defining a combustion chamber including a flow axis and a primary combustion zone, said liner having a forward end and an aft end such that said liner circumscribes the flow axis; and
      a shell circumscribing said liner such that a cooling duct is defined between said liner and said shell, said shell comprising a unisleeve having a forward end and an aft end, said aft end of said unisleeve being positioned axially upstream of said aft end of said liner, defining a circumferential gap between said aft end of said liner and said aft end of said unisleeve, wherein said circumferential gap defines a flow path between said cooling duct and an exterior of said shell, and wherein said unisleeve is mounted to said liner at circumferentially spaced locations along an axial plane between the forward end and the aft end of the unisleeve.

16. A combustion system in accordance with claim 15, wherein said shell comprises a flow sleeve coupled to said unisleeve at a sealed seam.

17. A combustion system in accordance with claim 16, further comprising an instrument coupled to said flow sleeve of said shell where said flow sleeve overlaps the primary combustion zone of said combustion chamber.

18. A combustion system in accordance with claim 17, wherein said instrument penetrates said shell and said liner.

19. A combustion system in accordance with claim 17, wherein said instrument is one of an igniter, a cross-fire tube, and a sensor.

20. A combustion system in accordance with claim 15, wherein said liner is a single-piece, unitary structure.

* * * * *